United States Patent Office 3,354,825
Patented Nov. 28, 1967

3,354,825
LITHOGRAPHIC PLATE AND METHOD OF
MAKING SAME
John E. Pickard, Selma, Ind., assignor to Ball Brothers
Company Incorporated, Muncie, Ind., a corporation
of Indiana
No Drawing. Filed June 19, 1967, Ser. No. 647,227
7 Claims. (Cl. 101—455)

ABSTRACT OF THE DISCLOSURE

A method for coating lithographic substrates including, cleaning the substrate, immersing the substrate in a freshly-prepared, oxygen-evolving, aqueous solution including sodium peroxide and phosphorus pentoxide, and insolubilizing the coating formed by immersion, and substrate so coated.

---

This application is a continuation-in-part of U.S. application Ser. No. 549,733, filed May 12, 1966, which application was in turn a continuation of application Ser. No. 308,651, filed Sept. 13, 1963, and now abandoned.

The invention relates to a new and improved lithographic plate and to a novel method of making the plate. More particularly, the invention relates to an improved coated lithographic plate and to the novel method for making such a plate.

Years ago, lithographic plates generally were made from zinc sheets, but more recently aluminum and other materials have been employed in the making of lithographic plates because of the tendency of the zinc plates to scum. Scumming results in poor impressions and requires interruption of the press run for cleaning of the plate. However, plates made from aluminum and other metals such as magnesium, copper, stainless steel, etc., as well as plastic and paper also have been found to be deficient in various respects. For example, the press life of aluminum plates is relatively short. While attempts have been made to correct the deficiencies of the various types of plates such as by the incorporation of special additives in fountain solutions and printing inks, these attempts have not proven successful.

In view of these unsuccessful attempts at correcting the deficiencies of previous plates, it was completely unexpected and surprising to discover a new and improved lithographic plate which permits longer continuous press runs and greater flexibility in press operation. Moreover, the invention provides a simple, low cost method for producing such improved plates.

In accordance with the present invention, a new and improved lithographic plate is produced by a method which comprises cleaning a plate to remove any surface contaminants thereon, applying to the cleaned surface a freshly-prepared aqueous phosphate glass composition so that oxygen is evolved, insolubilizing the coating on the plate, removing any water-soluble materials and drying the resulting coated plate.

A plate having a prepared surface, for example, a surface which has been grained by known methods such as through the use of an abrasive slurry, e.g., a mixture of pumice and quartz, is cleaned to provide a uniform surface free from any contaminants such as particles, lubricants, abrasives, etc. After the cleaning step, the plate is coated with a freshly-prepared aqueous phosphate composition, generally a mixture of sodium peroxide and phosphorus pentoxide. Advantageously, the concentration of these two ingredients is between about 1% and 20% by weight of the mixture and preferably between about 8% and 18%. Optimum results are obained when about 12% to 17% of the mixture consists of sodium peroxide and phosphorus pentoxide.

Coating is accomplished only during the evolution of oxygen from the solution. Thus it is important that the solution be used soon after mixing, or that additional ingredients be added to rejuvenate the solution. Any such solution evolving oxygen is considered to be freshly prepared.

The relative proportions of the sodium peroxide to the phosphorus pentoxide are generally in the range of about equal molar ratios and advantageously between about 0.1 to about 2 moles of the sodium peroxide for each mole of the phosphorus pentoxide. Preferably, the ratio is between about 0.2 to 1.4 mole of the peroxide for each mole of the pentoxide with particularly advantageous results being achieved when the ratio is between about 0.5 and 1.2 to 1. When the ratio of the sodium peroxide to the phosphorus pentoxide is about 0.8 to 1, the mixture is a solid, while at lower and higher ratios, the mixture is a liquid.

Minor amounts of materials such as a silicate or a molybdenum compound may be employed in the phosphate composition. Advantageously, up to about 5% by weight of each of a silicate and a molybdate may be present. For example, with sodium meta-silicate a proportion of between about 1 and 4.5% and especially between about 2.5 and 4%, is preferred. The proportion for sodium molybdate is advantageously less than about 3% and preferably between about 0.1 and 1%.

The total active ingredients in the coating composition may vary over a wide range, e.g., from about 1% to 35% by weight of the composition. Advantageously, the proportion will be between about 5% and 32% and preferably between about 10% and 30% by weight.

The coating composition is advantageously maintained at an elevated temperature during the coating operation and preferably between about 150° and 190° F. If the temperature is too low, there is a tendency for the coating on the plate to be uneven, whereas if the temperature is too high, the coating may not adhere satisfactorily to the plate.

After the plate has been coated with the phosphate composition, the coating is advantageously hardened to maximize press life of the plate. This hardening or insolubilizing of the coating may be accomplished by various known methods, including heating the coating at an elevated temperature, application of a solution of a water-soluble chromium salt, etc. Chromates are preferred hardening agents. Hardening solutions for phosphate coatings which are commercially available include Fosrinse C sold by Pennsalt Chemicals Corporation, which is a dilute solution of chromic acid having a pH of 4–5.

The following examples illustrates various embodiments of the method of the present invention. These examples are intended to be illustrative of the invention and not restrictive of the scope thereof. In the examples, parts and percentages are by weight.

Example I

A rolled zinc plate of a size of about 20 by 23 inches and a thickness of about 0.01 inch, which had been grained previously, was scrubbed clean by a lamb's wool brush and thoroughly rinsed. Thereafter, the plate was immersed in a freshly-prepared aqueous bath containing about 16% of a phosphate mixture formed from sodium peroxide and phosphorous pentoxide in about a 1 to 1 molar ratio, 3.5% sodium metasilicate and 0.5% sodium molybdate. The bath was maintained at a temperature of about 185° F. After about 15 seconds, the coated plate was removed from the bath and then immersed in a second bath to insolubilize the phosphate coating. The hardening bath containing 0.3% of Fosrinse C dissolved in water was maintained at about 140° F. After about 15 seconds in the hardening bath, the plate was removed, rinsed with water and placed in an electrically heated oven maintained at a temperature of about 250° F. for about one minute until the water retained in the coating had evaporated.

The coated plate was processed together with uncoated plates in both the wipe-on and presensitized plate processes. Tests comparing uncoated plates with plates coated in accordance with the invention showed that the coated plates gave continuous press runs of about 40,000 impressions or more, whereas the uncoated plates had a tendency to scum after even relatively short press runs of about 500 impressions. With the coated plates, scumming did not occur even after about 100,000 impressions.

*Example II*

The procedure of this example was the same as that of Example I except that aluminum plates were coated instead of the zinc plates. The coated aluminum plates showed the same superiority in press runs observed with the coated plates of Example I.

*Example III*

The procedure of this example was the same as that of Example I except as follows: 1% of phosphomolybdic acid was employed in the coating bath in place of the sodium molybdate, and the plates were immersed in the bath for about three minutes. The drying of the plates was performed at a temperature of about 160° F. Tests performed with plates coated in accordance with the method of this example showed superior press runs similar to the coated plates of Example I.

*Example IV*

The procedure of this example was the same as that of Example I except as follows: The coating bath contained about 12% of the phosphate mixture and the plates were immersed in the bath for about three minutes. The plates were dried after the coating and hardening treatments at a temperature of about 160° F. The press runs of plates coated according to this example were of long duration and similar to those of the coated plates of Example I.

*Example V*

The procedure of this example was the same as that of Example I except as follows: The coating bath contained about 2% of the phosphate mixture. Both zinc and aluminum plates were coated by being immersed in the bath for about ten minutes. The plates coated according to the method of this example were substantially identical in press performance to the coated plates of Examples I and II.

*Example VI*

The procedure of this example was the same as that of Example I except that the phosphate composition contained sodium peroxide and phosphorus pentoxide in a molar ratio of about 0.5 to 1. Both zinc and aluminum plates coated according to the method of this example proved far superior to uncoated plates in the length of press runs and the flexibility of press operation in a manner similar to the superiority of the coated plates of Example I.

*Example VII*

The procedure of this example was the same as that of Example I except that the phosphate composition contained sodium peroxide and phosphorus pentoxide in a molar ratio of about 1.2 to 1. Plates coated according to the method of this example were substantially identical in press performance to the coated plates of Example I.

Plates made according to the procedure of the above examples but omitting the silicate and molybdenum compounds from the coating bath formulations, also provide substantially improved press performance over that of uncoated plates. However, the improvement in the length of press runs and the flexibility of press operation is not as great as that achieved when the silicate and molybdenum compounds are employed in the coating baths.

The above description shows that the present invention provides a new and improved lithographic plate having substantially increased press life which was not attainable with previous plates. Furthermore, the plate permits greater flexibility in press operation. Moreover, the invention provides a simple and convenient method for producing such improved plates which is relatively low in cost.

It will be apparent from the above discussion that various modifications in the specific procedures described herein may be made within the scope of the invention. Therefore, the invention is not intended to be limited to the particular procedures described in detail except as may be required by the following claims.

What is claimed is:

1. A method of producing an insoluble, hydrophilic layer on a metal substrate comprising applying to a clean surface of said substrate a freshly-prepared solution produced by mixing sodium peroxide and phosphorus pentoxide in water whereby oxygen is evolved from said solution at said surface and a coating is formed on said surface, insolubilizing said coating by exposing the coating to a solution containing chromate ions, and removing any water-soluble materials remaining in said coating after said insolubilization.

2. A method as set forth in claim 1 wherein the coating solution is formed by adding between about 0.1 to about 2 moles of sodium peroxide for each mole of phosphorus pentoxide.

3. A method as set forth in claim 2 in which the coating solution is maintained at a temperature between about 150° and 190° F. while on said substrate.

4. A method as set forth in claim 1 wherein the coating is insolubilized by dipping in a diluted solution of chromic acid and having a pH of between about 4 to 5.

5. A method as set forth in claim 1 wherein the coating solution contains at least one of a metasilicate and a molybdate in amounts up to 5% by weight of each.

6. A method of producing an insoluble, hydrophilic layer on a metal substrate comprising applying to a clean, grained metal plate at a temperature between about 150° F. and 190° F. a freshly-prepared aqueous coating solution formed by mixing between 12% and 17% by weight of sodium peroxide and phosphorus pentoxide in water whereby oxygen is evolved at said surface, the ratio of sodium peroxide per mole of phosphorus pentoxide being between about 0.5 to 1.2 moles, said solution including between about 2.5% and 4% by weight of sodium metasilicate and between about 0.1% and 1% by weight of sodium molybdate; insolubilizing coating on said substrate by exposure to a chromate ion, and removing any water-soluble materials remaining on said plate, whereby a coating is formed on said substrate.

7. A lithographic plate having an insoluble, hydrophilic coating thereon prepared according to the method of claim 1.

References Cited

UNITED STATES PATENTS 3,030,210  4/1962  Chebiniak _____ 96—33 XR
3,148,984  9/1964  Harper _____ 148—6.15 XR
3,201,247  8/1965  Leonard _____ 98—86 XR DAVID KLEIN, *Primary Examiner.*